(12) United States Patent
Matsumoto

(10) Patent No.: US 12,057,149 B2
(45) Date of Patent: *Aug. 6, 2024

(54) HEAT-ASSISTED MAGNETIC RECORDING (HAMR) HEAD WITH MAIN POLE HAVING NARROW POLE TIP WITH PLASMONIC LAYER

(71) Applicant: Western Digital Technologies, Inc., San Jose, CA (US)

(72) Inventor: Takuya Matsumoto, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,171

(22) Filed: May 23, 2023

(65) Prior Publication Data

US 2024/0161777 A1 May 16, 2024

Related U.S. Application Data

(60) Provisional application No. 63/425,262, filed on Nov. 14, 2022.

(51) Int. Cl.
*G11B 5/00* (2006.01)
*G11B 5/31* (2006.01)
*G11B 5/60* (2006.01)
*G11B 11/105* (2006.01)
*G11B 13/08* (2006.01)

(52) U.S. Cl.
CPC ............ *G11B 5/6088* (2013.01); *G11B 5/314* (2013.01); *G11B 11/10536* (2013.01); *G11B 13/08* (2013.01); *G11B 2005/0021* (2013.01)

(58) Field of Classification Search
CPC ..... G11B 5/6088; G11B 5/314; G11B 5/4866; G11B 13/08; G11B 2005/0021; G11B 5/012
USPC .......................................................... 360/59
See application file for complete search history.

(56) References Cited

U.S. PATENT DOCUMENTS

| | | |
|---|---|---|
| 6,768,556 B1 | 7/2004 | Matsumoto et al. |
| 8,705,327 B2 | 4/2014 | Matsumoto |
| 10,121,496 B1 | 11/2018 | Peng et al. |
| 10,249,333 B2 | 4/2019 | Maletzky et al. |
| 10,262,683 B2 * | 4/2019 | Staffaroni ............ G11B 5/6088 |
| 10,482,907 B1 | 11/2019 | Mani Biswas et al. |
| 10,770,098 B1 | 9/2020 | Peng |

(Continued)

OTHER PUBLICATIONS

U.S. Appl. No. 17/821,166, filed Aug. 20, 2022.

*Primary Examiner* — Nabil Z Hindi
(74) *Attorney, Agent, or Firm* — PATTERSON + SHERIDAN, LLP

(57) ABSTRACT

A heat-assisted magnetic recording (HAMR) head has a slider with a gas-bearing-surface (GBS). The slider supports a near-field transducer (NFT) with an output tip at the GBS and a main magnetic pole with a pole tip at the GBS. The pole tip has a narrow cross-track width that can be substantially the same as the cross-track width of the NFT output tip. A plasmonic layer is located between the main pole and the NFT and has a tip at the GBS between the main pole tip and the NFT output tip. The plasmonic layer may also be located on the cross-track sides of the main pole and the main pole tip.

24 Claims, 13 Drawing Sheets

(56) References Cited

U.S. PATENT DOCUMENTS

| | | |
|---|---|---|
| 10,811,038 B1 | 10/2020 | Peng et al. |
| 2011/0090588 A1 | 4/2011 | Gao et al. |
| 2015/0287425 A1 | 10/2015 | Guler et al. |
| 2016/0329068 A1 | 11/2016 | Matsumoto et al. |
| 2019/0088273 A1 | 3/2019 | Chen et al. |
| 2019/0198053 A1 | 6/2019 | Krichevsky et al. |

\* cited by examiner

Cross Section B-B

Cross Section B-B

Cross Section B-B

HEAT-ASSISTED MAGNETIC RECORDING (HAMR) HEAD WITH MAIN POLE HAVING NARROW POLE TIP WITH PLASMONIC LAYER

CROSS-REFERENCE TO RELATED APPLICATIONS

This application claims benefit of U.S. Provisional Patent Application No. 63/425,262, filed Nov. 14, 2022, which is herein incorporated by reference.

BACKGROUND OF THE DISCLOSURE

Field of the Disclosure

This invention relates generally to a heat-assisted magnetic recording (HAMR) disk drive, in which data are written while the magnetic recording layer on the disk is at an elevated temperature, and more specifically to an improved HAMR head.

Description of the Related Art

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-Ku magnetic recording material is heated locally during writing by the main magnetic pole to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a near-field transducer (NFT) for heating the recording layer on the disk. A "near-field" transducer refers to "near-field optics", wherein the passage of light is through an element with sub-wavelength features and the light is coupled to a second element, such as a substrate like a magnetic recording layer, located a sub-wavelength distance from the first element to generate a heated optical spot on the recording layer. The NFT is typically located at the gas-bearing surface (GBS) of the gas-bearing slider that also supports the read head and write head and rides or "flies" above the disk surface. The write head includes a main pole with a tip at the GBS near the NFT that directs a magnetic field to the recording layer while the NFT heats the recording layer. A thermal shunt of high thermal conductivity material is located between the NFT and the main pole to allow heat to be transferred away from the optical spot to heat sink material located on the cross-track sides of the main pole.

A NFT with a generally triangular or trapezoidal shaped output tip is described in U.S. Pat. No. 8,705,327 B2 assigned to the same assignee as this application. In this NFT an evanescent wave generated at a surface of the waveguide couples to surface plasmons excited on the surface of the NFT and a strong optical near-field is generated at the apex of the output tip.

SUMMARY OF THE DISCLOSURE

It is important that the HAMR disk has a high thermal gradient in the recording layer, meaning there is a sharp drop in temperature at the edges of the bits being recorded. It has been proposed to add a layer of plasmonic material on the main pole and facing the NFT to increase the thermal gradient, as described in U.S. Pat. No. 10,121,496 B1. However, the addition of the plasmonic layer can increase the temperature of the NFT to an unacceptable level. An additional problem in HAMR is adjacent track interference, i.e., writing on tracks adjacent to the track intended to be written.

In embodiments of this invention, the cross-track width of the main pole tip at the GBS is very narrow and can be substantially the same as the cross-track width of the NFT output tip. This narrow main pole tip substantially reduces the possibility of adjacent track interference. Embodiments of the invention also include a plasmonic layer but with a tip with a narrow cross-track width at the GBS between the main pole tip and the NFT output tip. When plasmonic material is added between the main pole tip and the NFT output tip and the direction of light polarization is in the along-the-track direction, image charges are induced in the plasmonic material which produces a localized optical near-field between the main pole tip and the NFT output tip due to interaction between charges at the top of the NFT and the image charges. Because the optical near-field is localized in the gap between the plasmonic tip and the NFT output tip, the thermal gradient in the recording layer can be increased. The narrow plasmonic tip heats the NFT output tip less than a wider plasmonic tip.

For a fuller understanding of the nature and advantages of the present invention, reference should be made to the following detailed description taken together with the accompanying figures.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
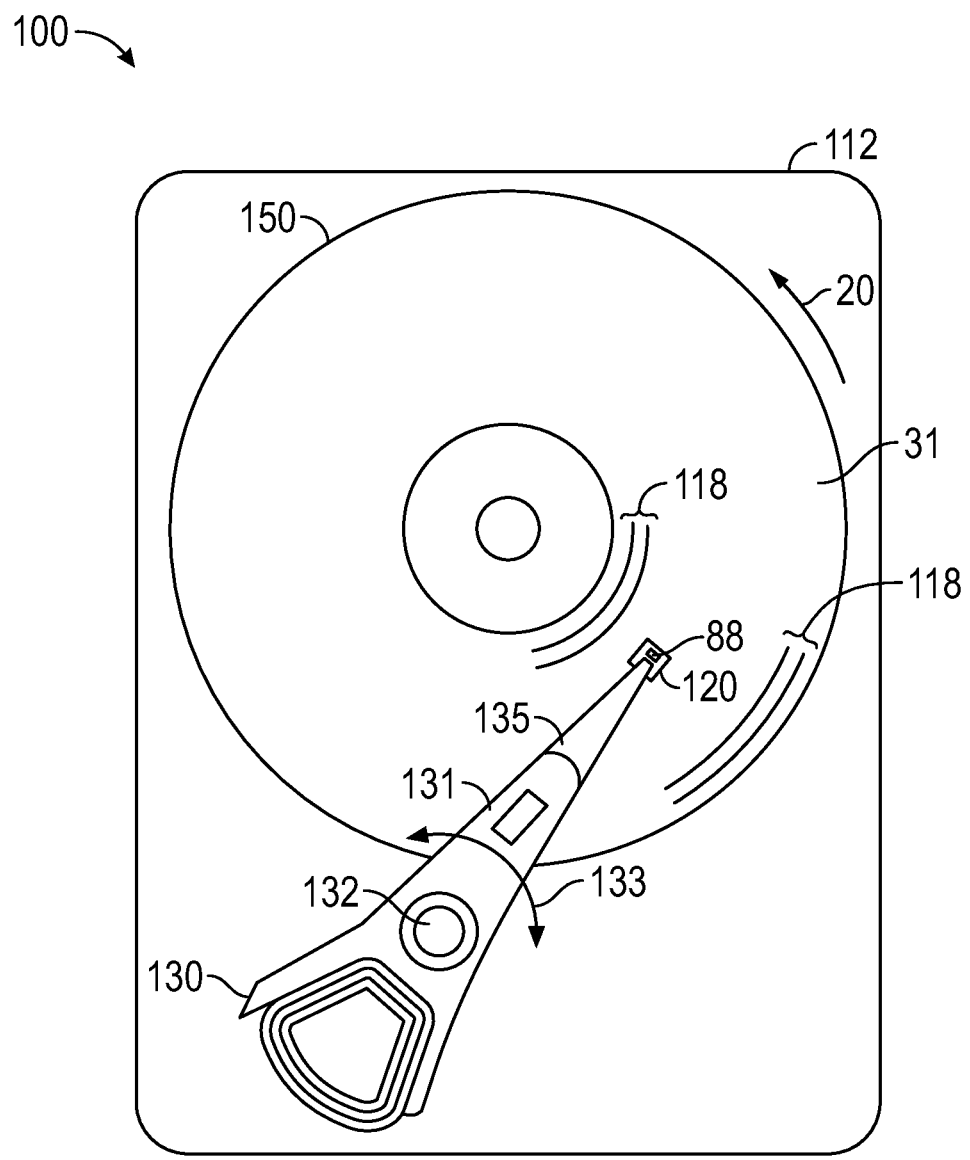
FIG. 1 is a top view of a heat-assisted magnetic recording (HAMR) disk drive according to an embodiment of the invention.

FIG. 1 is a top view of a heat-assisted recording (HAMR) disk drive 100 according to an embodiment of the invention. In FIG. 1, the HAMR disk drive 100 is depicted with a disk 150 with magnetic recording layer 31 of conventional continuous magnetic recording material arranged in radially-spaced circular tracks 118. Only a few representative tracks 118 near the inner and outer diameters of disk 150 are shown. However, instead of a conventional continuous magnetic recording layer, the recording layer may be a bit-patterned-media (BPM) layer with discrete data islands.

The drive 100 has a housing or base 112 that supports an actuator 130 and a drive motor for rotating the magnetic recording disk 150. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 150 and enables it to "pitch" and "roll" on the bearing of gas (typically air or helium) generated by the disk 150 as it rotates in the direction of arrow 20. The slider 120 supports the HAMR head (not shown), which includes a magnetoresistive read head, an inductive write head, the near-field transducer (NFT) and optical waveguide. A semiconductor laser 88 with a wavelength of 780 to 980 nm may used as the HAMR light source and is depicted as being supported on the top of slider 120. Alternatively the laser may be located on suspension 135 and coupled to slider 120 by an optical channel. As the disk 150 rotates in the direction of arrow 20, the movement of actuator 130 allows the HAMR head on the slider 120 to access different data tracks 118 on disk 150. The slider 120 is typically formed of a composite material, such as a composite of alumina/titanium-carbide ($Al_2O_3$/ TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
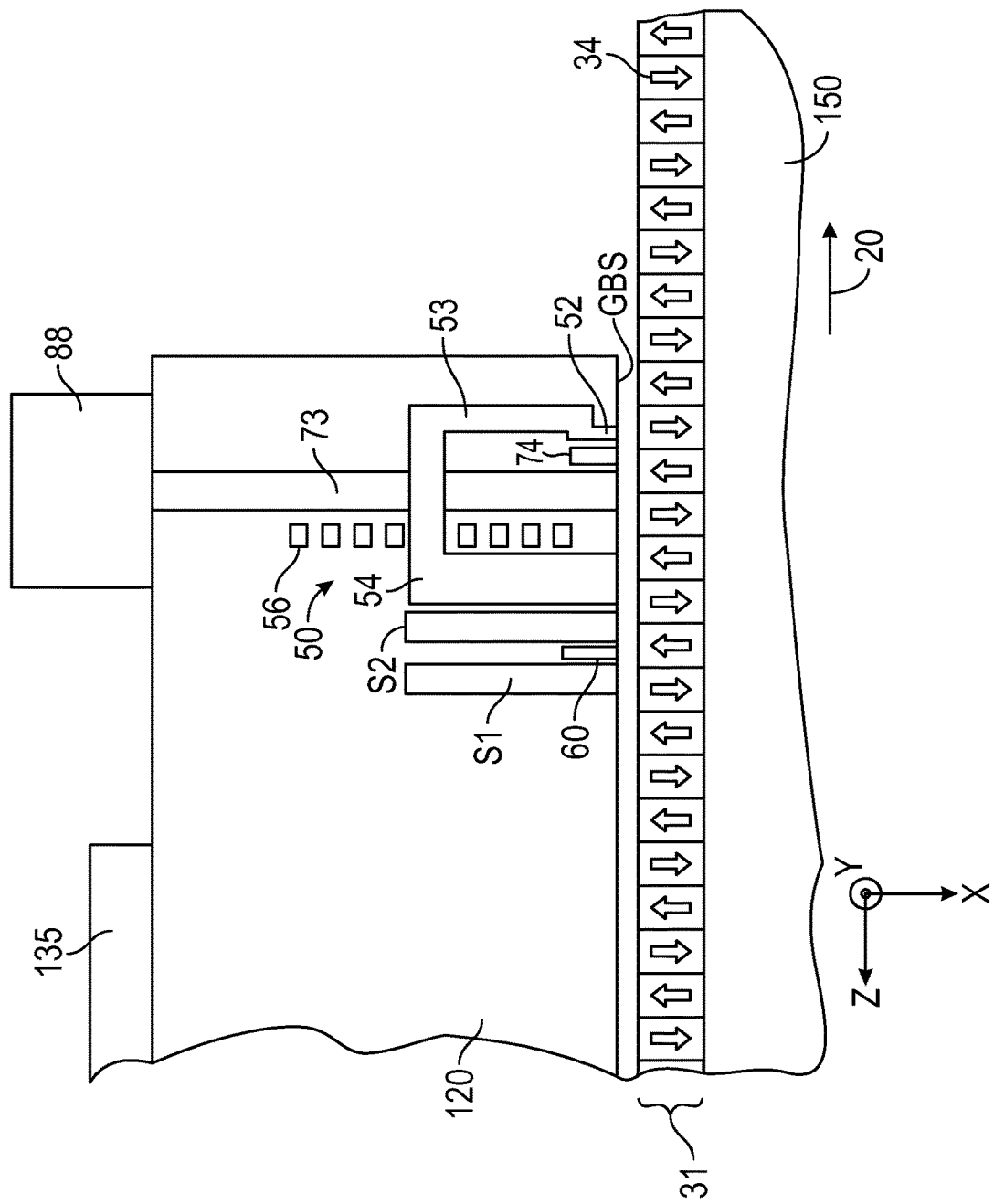
FIG. 2 is a side a sectional view, not drawn to scale because of the difficulty in showing the very small features, of a gas-bearing slider for use in a HAMR disk drive and a portion of a HAMR disk according to the prior art.

In the following drawings, the X-axis denotes an axis perpendicular to the gas-bearing surface (GBS) of the slider, the Y-axis denotes a track width or cross-track axis, and the Z-axis denotes an along-the-track axis. FIG. 2 is a schematic cross-sectional view illustrating a configuration example of a HAMR head according to the prior art. In FIG. 2, the disk 150 is depicted with the recording layer 31 being a conventional continuous magnetic recording layer of magnetizable material with magnetized regions or "bits" 34. The gas-bearing slider 120 is supported by suspension 135 and has a GBS that faces the disk 150 and supports the magnetic write head 50, read head 60, and magnetically permeable read head shields S1 and S2. A recording magnetic field is generated by the write head 50 made up of a coil 56, a primary magnetic pole 53 for transmitting flux generated by the coil 56, a main pole 52 connected to the primary pole 53, and a return magnetic pole 54 coupled to the primary pole 53 and main pole 52. A magnetic field generated by the coil 56 is transmitted through the primary pole 53 to the main pole 52 arranged in a vicinity of an optical near-field transducer (NFT) 74. FIG. 2 illustrates the write head 50 with a well-known "pancake" coil 56, wherein the coil segments lie in substantially the same plane. However, alternatively the coil may be a well-known "helical" coil wherein the coil is wrapped around the primary magnetic pole 53. At the moment of recording, the recording layer 31 of disk 150 is heated by an optical near-field generated by the NFT 74 and, at the same time, a region or "bit" 34 is magnetized and thus written onto the recording layer 31 by applying a recording magnetic field generated by the main pole 52.

A semiconductor laser 88 is mounted to the top surface of slider 120. An optical waveguide 73 for guiding light from laser 88 to the NFT 74 is formed inside the slider 120. Materials that ensure a refractive index of the waveguide 73 core material to be greater than a refractive index of the surrounding cladding material (not shown) may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $Nb_2O_5$, $SiO_xN_y$, or Ge-doped $SiO_2$ as the core material. The waveguide 73 that delivers light to NFT 74 is preferably a single-mode waveguide.

Figure 3A:
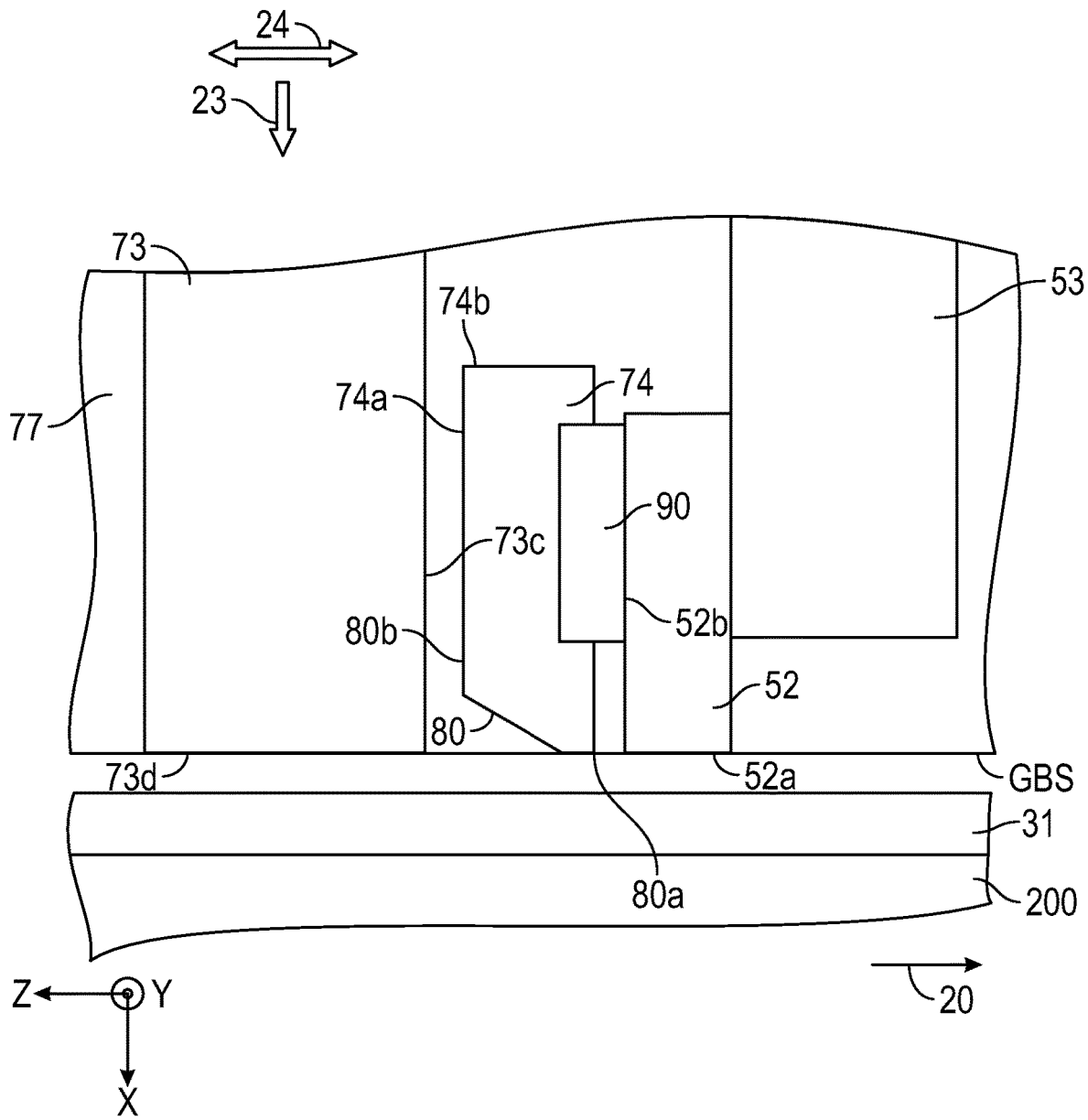
FIG. 3A is a side sectional view of the layers of material making up the main pole and primary pole, the near-field transducer (NFT) and the waveguide according to the prior art and shown in relation to the recording layer on the disk.

FIG. 3A is a side sectional view of a prior art HAMR head and shows the layers of material making up the primary pole 53, main pole 52, NFT 74 and waveguide 73 and shown in relation to disk 150 with recording layer 31. The main pole 52 is typically a layer of high-moment material like FeCo and has an output end 52a at the GBS and a surface 52b that faces the NFT 74. The waveguide 73 is a layer of core material generally parallel to the main pole 52 layer with a length orthogonal to the GBS and a waveguide end 73d at the GBS. The waveguide 73 has surrounding cladding material 77 and a generally planar surface 73c that faces and is parallel to NFT 74 layer. The NFT 74 layer is a conductive low-loss metal (preferably Au, but also Ag, Al, Cu, Rh, Ir or their alloys), is generally parallel to waveguide 73 layer and main pole 52 layer and is located between and spaced from the waveguide 73 layer and the main pole 52 layer. The NFT 74 layer has a surface 74a that faces and is spaced from waveguide surface 73c. The NFT 74 layer has an output tip 80 substantially at the GBS. When light is introduced into the waveguide 73, an evanescent wave is generated at the surface 73c and couples to a surface plasmon excited on the surface 74a of NFT 74. Arrow 23 shows the direction of propagation of light in waveguide 73 and arrow 24 shows the direction of polarization of the light. The surface plasmon propagates to the output tip 80. The output tip 80 has an apex 80a that faces the main pole output end 52a and a back edge 80b that faces the waveguide surface 73c. At the apex 80a an optical near-field spot is generated in the space at the GBS between the output tip apex 80a and the main pole output end 52a. The main pole output end 52a applies a magnetic field at the optical spot. A thermal shunt 90 of material with high thermal conductivity like Au, Ag or Cu may be located between NFT 74 and main pole 52 to allow heat to be transferred from the optical spot to heat-sink material located on the cross-track sides of main pole 52. A thermal shunt is described in U.S. Pat. No. 8,619,516 B1, which is assigned to the same assignee as this application.

Figure 3B:
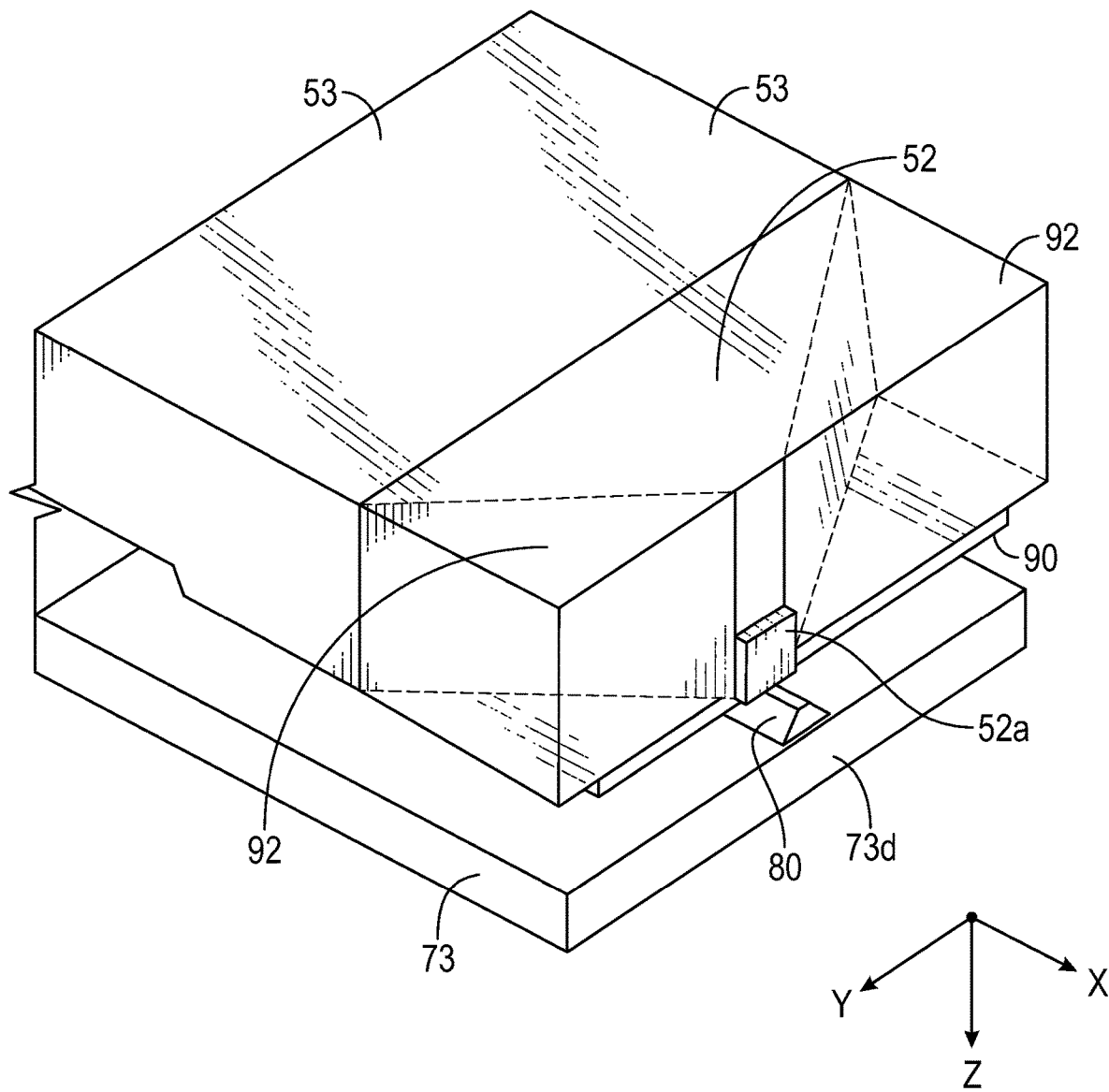
FIG. 3B is a perspective view of the main pole, primary pole, NFT, waveguide and heat-sink material on the cross-track sides of the main pole according to the prior art.

FIG. 3B is a perspective view of a prior art HAMR head and shows heat-sink material 92 in contact with thermal shunt 90, as well as the primary pole 53, the main pole 52, the NFT output tip 80 and the waveguide end 73d. Heat-sink material 92 is located on the cross-track sides of main pole 52 and connected to thermal shunt 90. If the heat-sink material 92 includes an element that may diffuse into the magnetic material of main pole 52, like Au or Cu, then a diffusion barrier layer (not shown) is located between main pole 52 and the heat-sink material 92. The material of the diffusion layer may be, for example, Rh, Ru, In, Co, W, Rh oxide, Ru oxide, Indium oxide, or TiN, with a thickness preferably in the range of 5-10 nm. If the heat-sink material 92 is selected from a material that is not likely to diffuse into the main pole 52, like Ru or Rh, then the diffusion layer is not required.

The HAMR head may include a full-film layer of plasmonic material under the main pole and facing the NFT, which has been proposed to increase the thermal gradient. One definition of a plasmonic material is a metal or metal alloy that has an extinction coefficient k at least twice as great as the index of refraction n at the wavelength of interest. Plasmonic materials provide excellent optical coupling with the NFT, which results in a confined heat source in the recording layer. Au, Ag and Cu are examples of plasmonic materials.

Figure 4A:
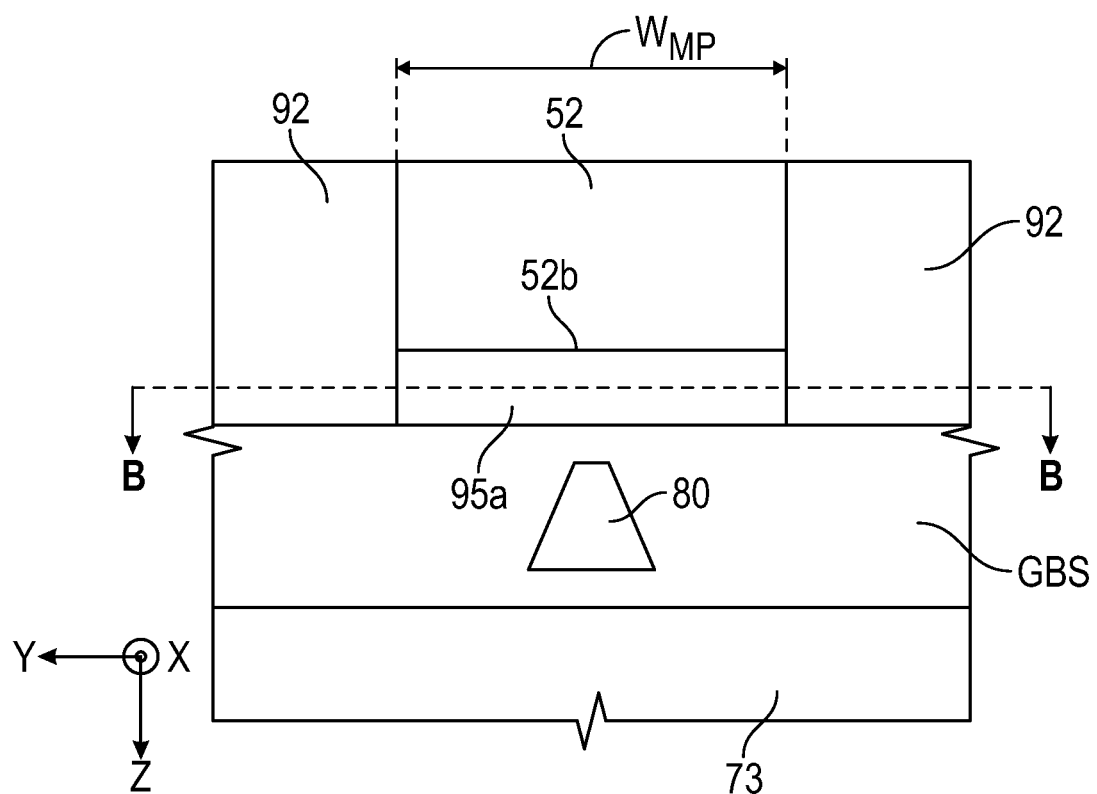
FIG. 4A is a view from the gas-bearings surface (GBS) of a HAMR head and FIG. 4B is a view of section B-B of FIG. 4A, for illustrating the full-film layer of plasmonic material.
Figure 4B:
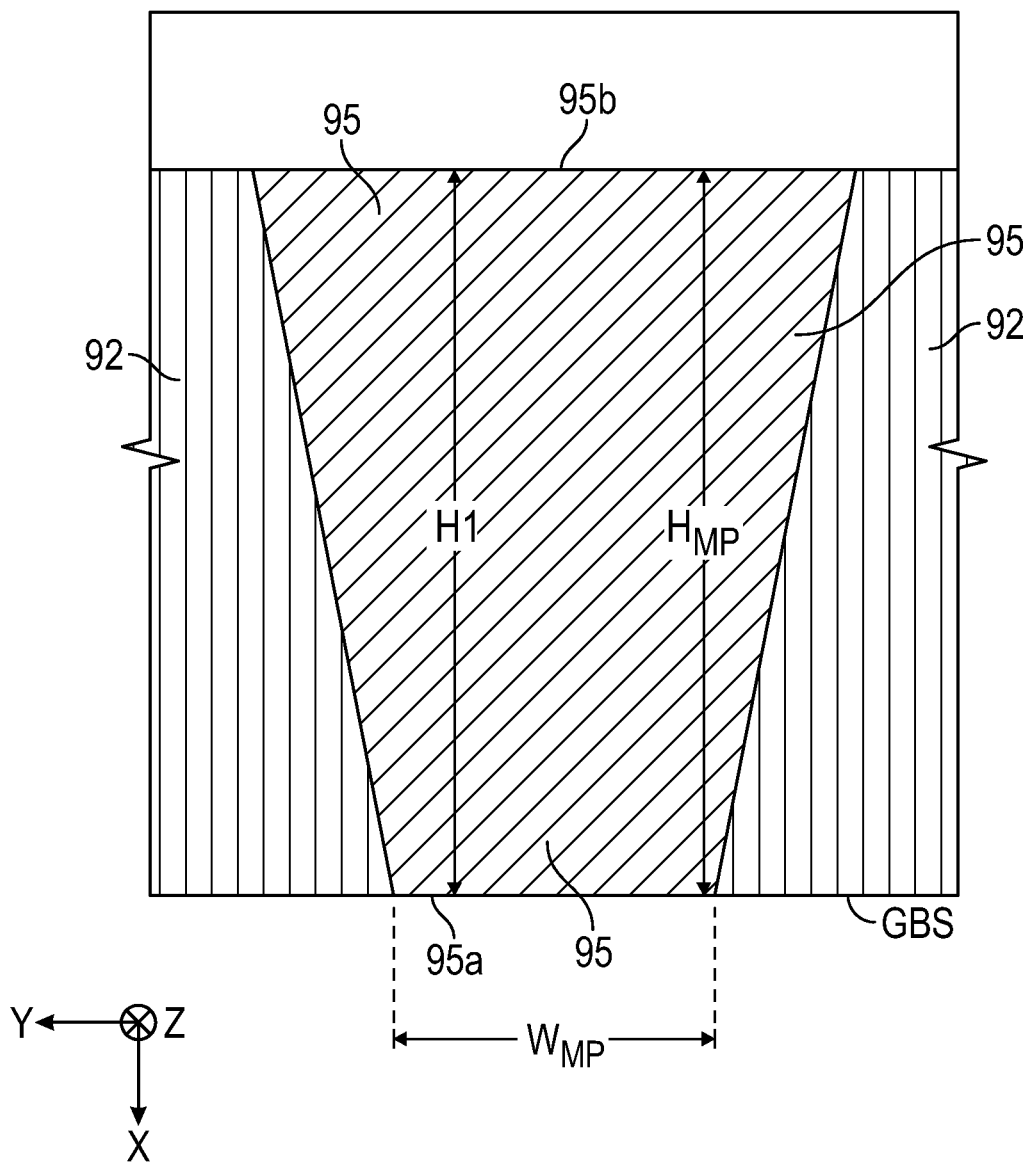

FIG. 4A is a view from the GBS of a HAMR head and FIG. 4B is a view of section B-B, for illustrating the full-film layer of plasmonic material. The full-film plasmonic layer 95 is located on the NFT-facing surface 52b of the main pole 52 and extends from the front edge 95a at the GBS to the back edge 95b recessed from the GBS. As shown in FIG. 4B, because the plasmonic layer is a full-film that substantially covers the NFT-facing surface of the main pole 52, the cross-track width (the Y-direction) of the plasmonic layer 95 is substantially the same as the cross-track width $W_{MP}$ of the main pole 52 at the GBS, which is typically between about 150 to 250 nm. The main pole has a height $H_{MP}$ (in the X-direction) and the plasmonic layer 95 has a height H1.

In embodiments of this invention, the cross-track width of the main pole tip at the GBS is very narrow and can be substantially the same as the cross-track width of the NFT output tip. This narrow main pole tip substantially reduces the possibility of adjacent track interference, i.e., writing on tracks adjacent to the track intended to be written. A plasmonic layer has a tip at the GBS between the main pole tip and the NFT output tip. When plasmonic material is added between the NFT output tip and the main pole tip and the direction of light polarization is in the along-the-track direction (the Z-direction), image charges are induced in the plasmonic material which produces a localized optical near-field between the NFT output tip and the main pole tip due to interaction between charges at the top of the NFT and the image charges. Because the optical near-field is localized in the gap between the plasmonic tip and the NFT output tip, the thermal gradient in the recording layer can be increased. The cross-track width of the plasmonic tip at the GBS can be substantially equal to, greater than or less than the cross-track width of the widest portion of the NFT output tip at the GBS. A narrow plasmonic tip heats the NFT output tip less than a wider plasmonic tip.

Figure 5A:
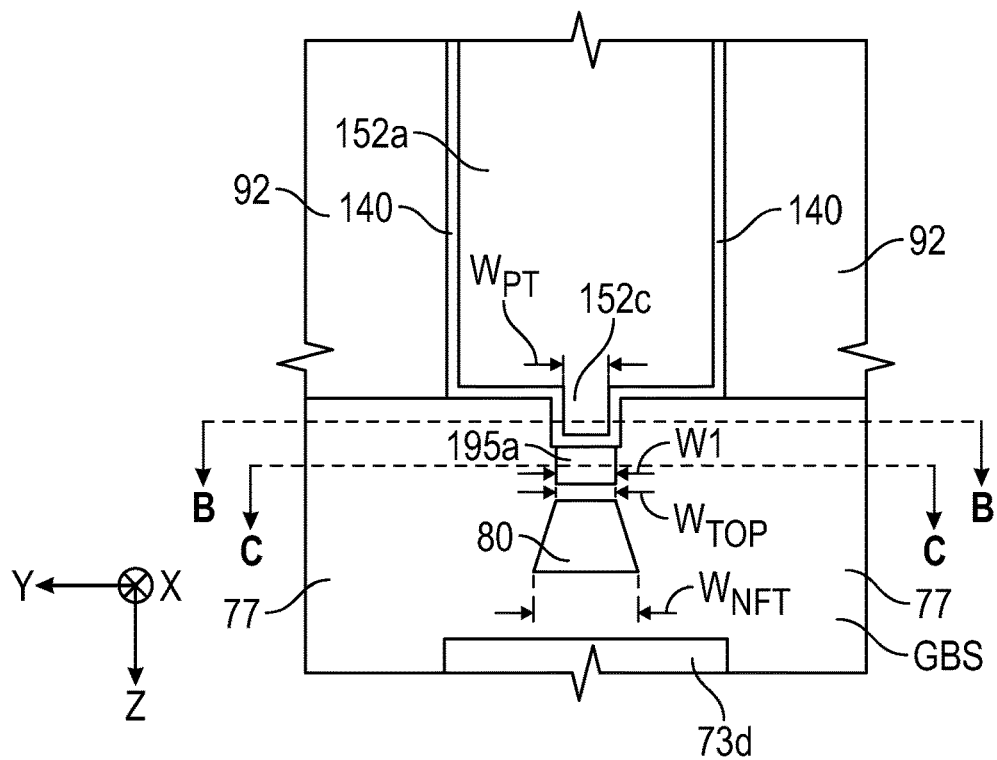
FIG. 5A is a sectional view and FIG. 5B and FIG. 5C are views of sections B-B and C-C of FIG. 5A, respectively, of a HAMR head according to an embodiment of the invention.
Figure 5B:
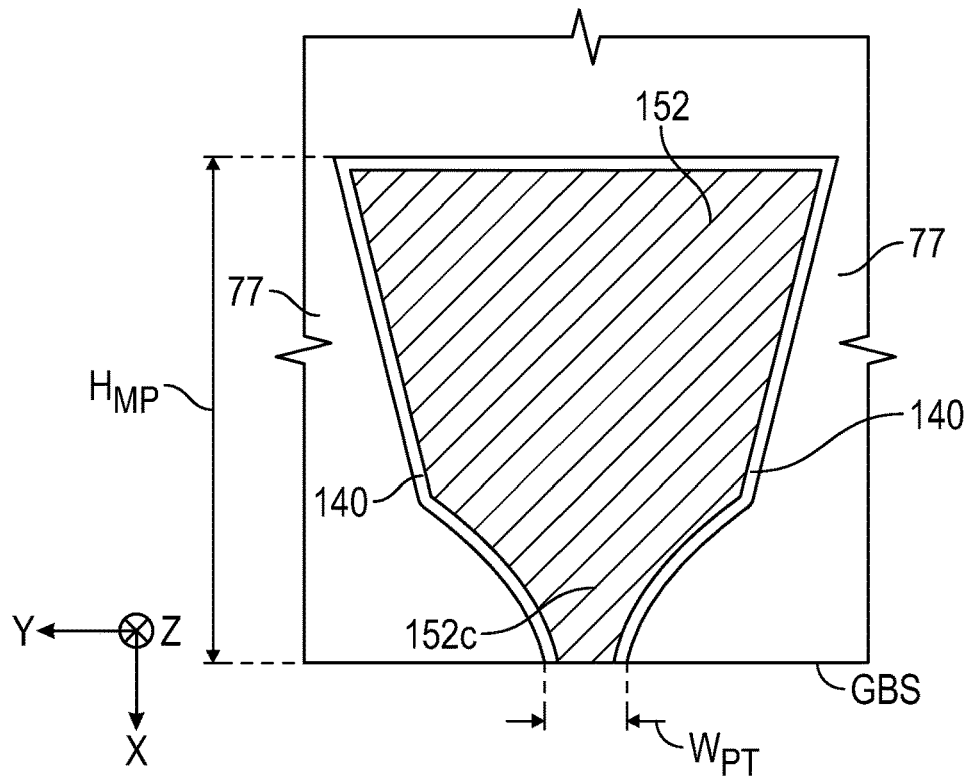
Figure 5C:
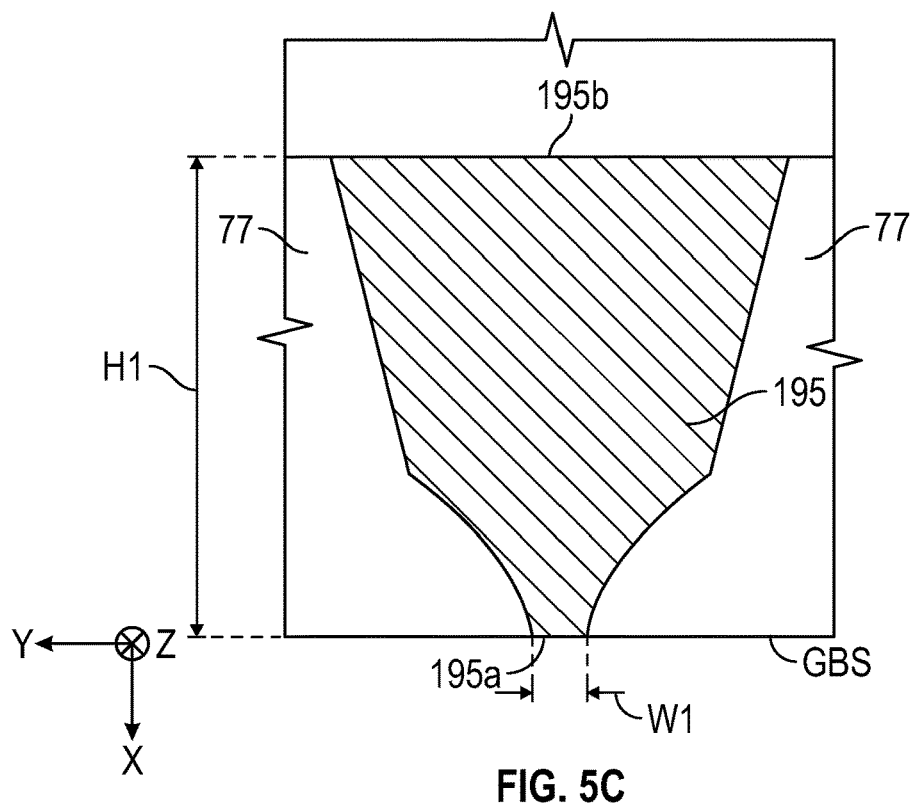

FIG. 5A is a sectional view and FIG. 5B and FIG. 5C are views of sections B-B and C-C, respectively, of a HAMR head according to an embodiment of the invention. FIG. 5A is a view from the GBS and shows NFT output tip 80, waveguide core end 73d and surrounding cladding material 77. As shown in FIG. 5A, the main pole output end 152a at the GBS has a tip 152c that faces the NFT 80 and is aligned with it in the along-the-track direction (the Z-direction). Plasmonic material with a tip 195a at the GBS is located on the main pole 152 and main pole tip 152c between main pole tip 152c and the NFT 80. In this embodiment, the cross-track width W1 of plasmonic tip 195a and $W_{PT}$ of main pole tip 152c at the GBS are both substantially equal to or less than the cross-track width of the widest width $W_{NFT}$ of NFT output tip 80 at the GBS. $W_{NFT}$ is the width at the portion farthest in the Z-direction from the plasmonic tip 195a and $W_{TOP}$ is the narrowest width and is closest to the plasmonic tip 195a in the Z-direction. $W_{NFT}$ is typically in the range of 50 to 150 nm. W1 is less than or equal to $W_{NFT}$ but can also be less than or equal to $W_{TOP}$. The track width of the recording is determined by $W_{TOP}$, which has a typical width between about 20-40 nm.

FIG. 5B is cross-section B-B of FIG. 5A and shows the shape of main pole 152 with tip 152c. FIG. 5C is cross-section C-C of FIG. 5A and shows plasmonic layer 195 on main pole 152 and tip 152c (which is located behind plasmonic layer 195 in the Z-direction and thus not depicted in FIG. 5C). In this embodiment plasmonic layer 195 with tip 195a at the GBS and back edge 195b recessed from the GBS covers the entirety of main pole 152 and tip 152c and thus has substantially the same shape as the main pole 152 and tip 152c. The main pole 152 has a height $H_{MP}$ (in the X-direction) (FIG. 5B) and the plasmonic layer 95 has a height H1 (FIG. 5C). H1 can be the same or less than $H_{MP}$. If H1 is made less than $H_{MP}$, then a portion of the main pole is aligned directly with the NFT layer in the Z-direction, which increases the magnetic field intensity at the recording layer. As shown in FIG. 5C the cross-track width of the plasmonic layer 195 in a region away from the plasmonic tip 195a in a direction orthogonal to the GBS (the X-direction) is greater than the cross-track width of the plasmonic tip 195a. As shown in FIGS. 5A and 5B, a thin diffusion barrier 140 between the main pole 152 and the cladding material 77, and between the heat sink material 92 and plasmonic layer 195 is required if the plasmonic layer is Au or another material that may diffuse into the material of the main pole 152, which is typically a CoFe or CoFeNi alloy.

Figure 5D:
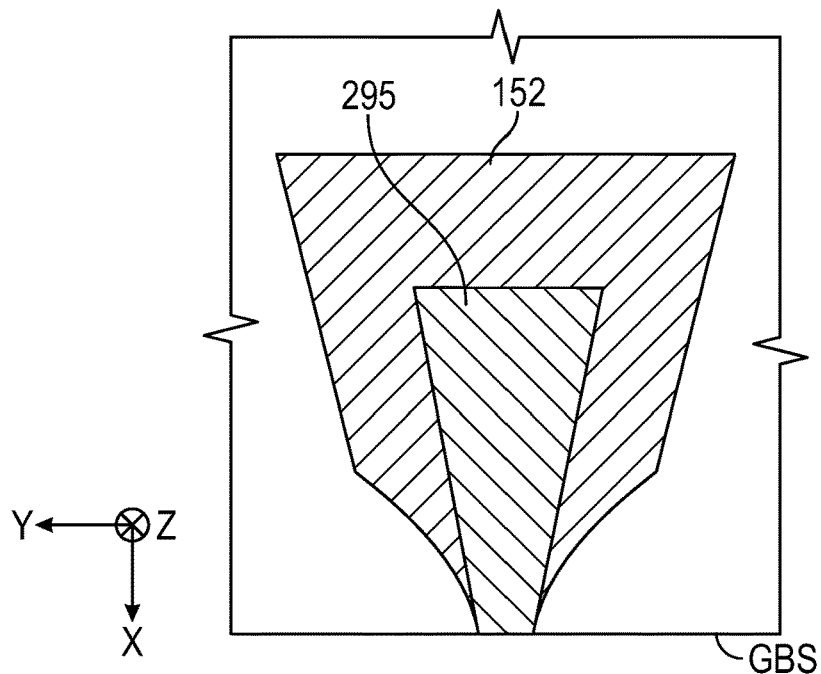
FIG. 5D is a view like FIGS. 5B and 5C for an embodiment wherein the cross-track width of the plasmonic layer is narrower than the cross-track width of the main pole in the direction recessed from the GBS.
Figure 5E:
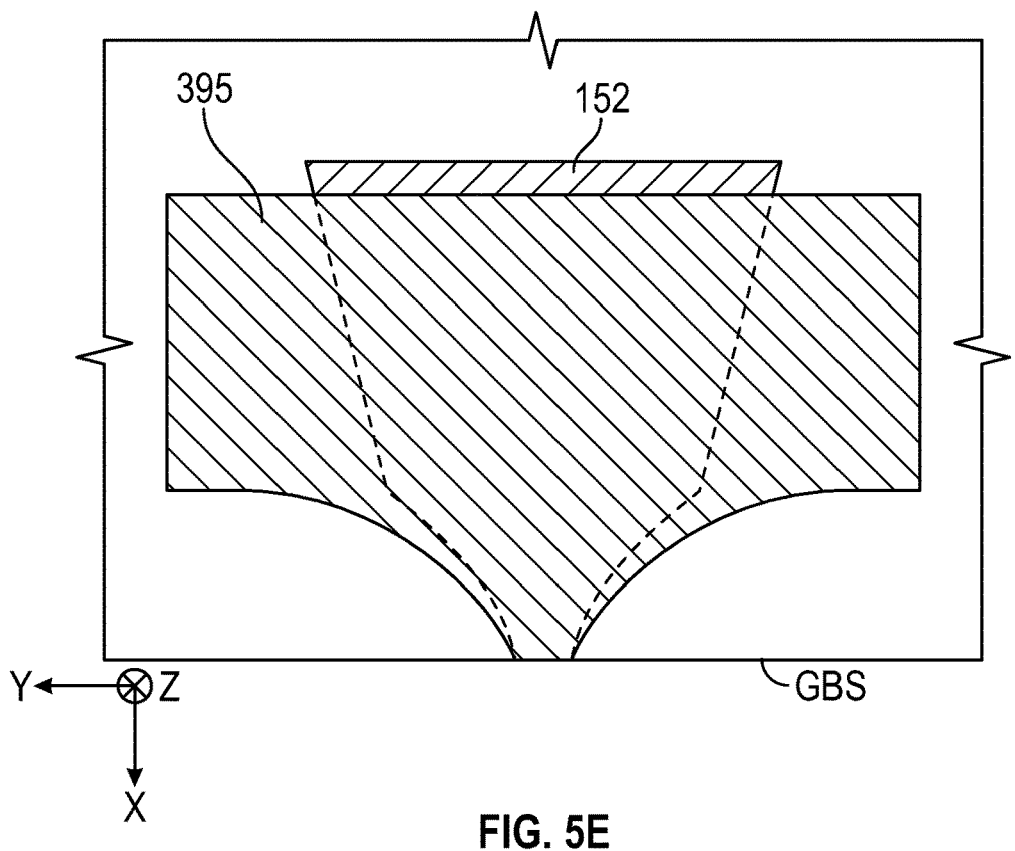
FIG. 5E is a view like FIGS. 5B and 5C for an embodiment wherein the cross-track width of the plasmonic layer is wider than the cross-track width of the main pole in the direction recessed from the GBS.

As shown by the comparison of the shape of the main pole 152 (FIG. 5B) with the shape of the plasmonic layer 195 (FIG. 5C), the plasmonic layer 195 is on the entirety of the main pole 152 and they have substantially the same shape. However, the cross-track width of the plasmonic layer can be narrower than the cross-track width of the main pole 152 in the direction recessed from the GBS (the X-direction), as shown by plasmonic layer 295 in FIG. 5D, or wider, as shown by plasmonic layer 395 in FIG. 5E.

Figure 5F:
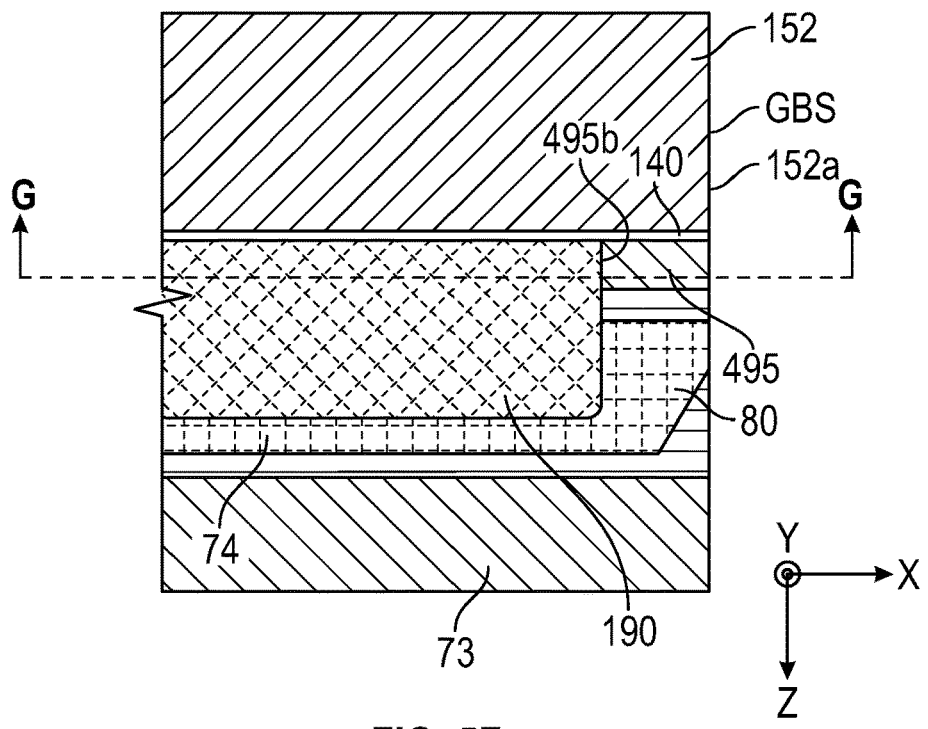
FIG. 5F is a sectional view, and FIG. 5G the view of section G-G of FIG. 5F, for an embodiment wherein the thermal shunt extends to the plasmonic layer and the plasmonic layer is truncated in the direction recessed from the GBS.
Figure 5G:
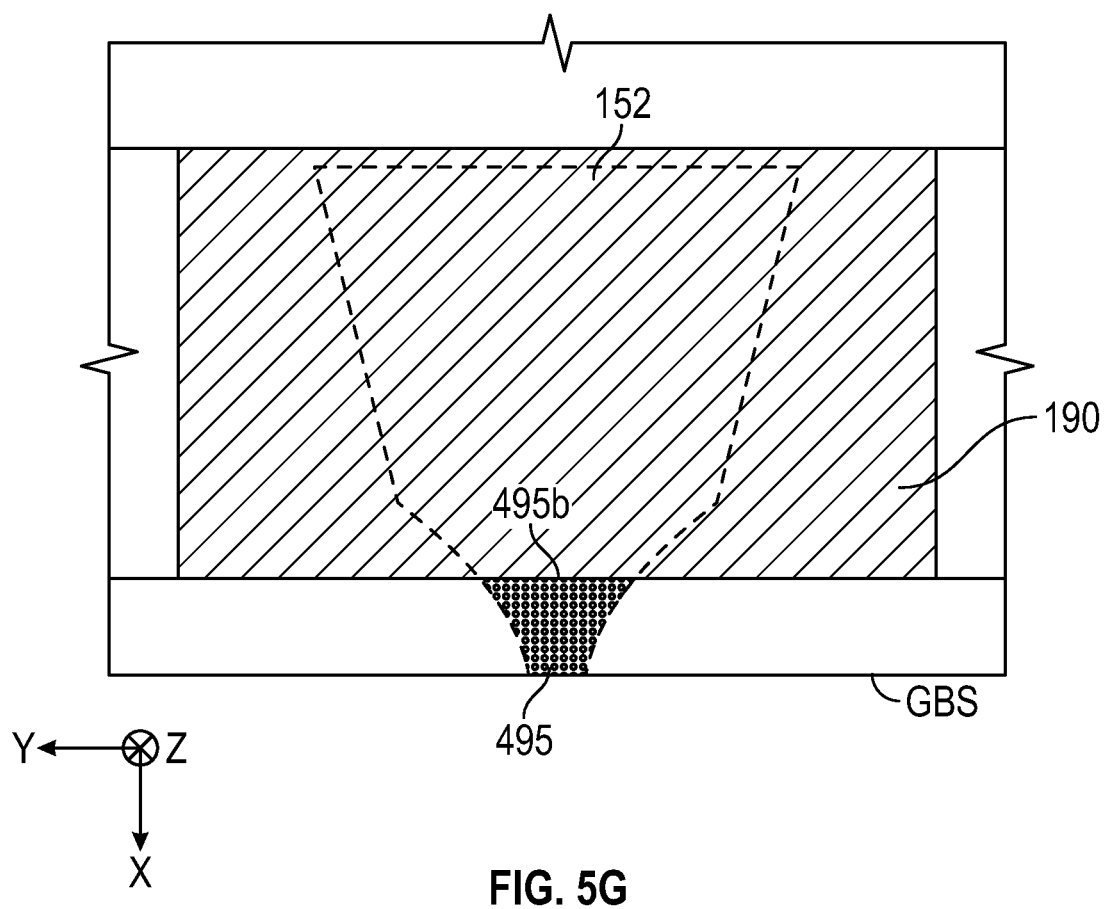

The plasmonic layer may extend to the thermal shunt. The thermal shunt is a high thermal conductivity material like Au, Ag or Cu located between the NFT and the main pole to allow heat to be transferred from the optical spot to heat-sink material located on the cross-track sides of main pole. This is shown by thermal shunt 90 between NFT 74 and main pole 52 in FIG. 3A. In an embodiment of this invention, as shown by the sectional view of FIG. 5F and the cross-section view of FIG. 5G, the thermal shunt 190 extends to the plasmonic layer 495 and the plasmonic layer 495 is truncated in the X-direction where it connects at its back edge 495b to the thermal shunt 190.

Figure 6A:
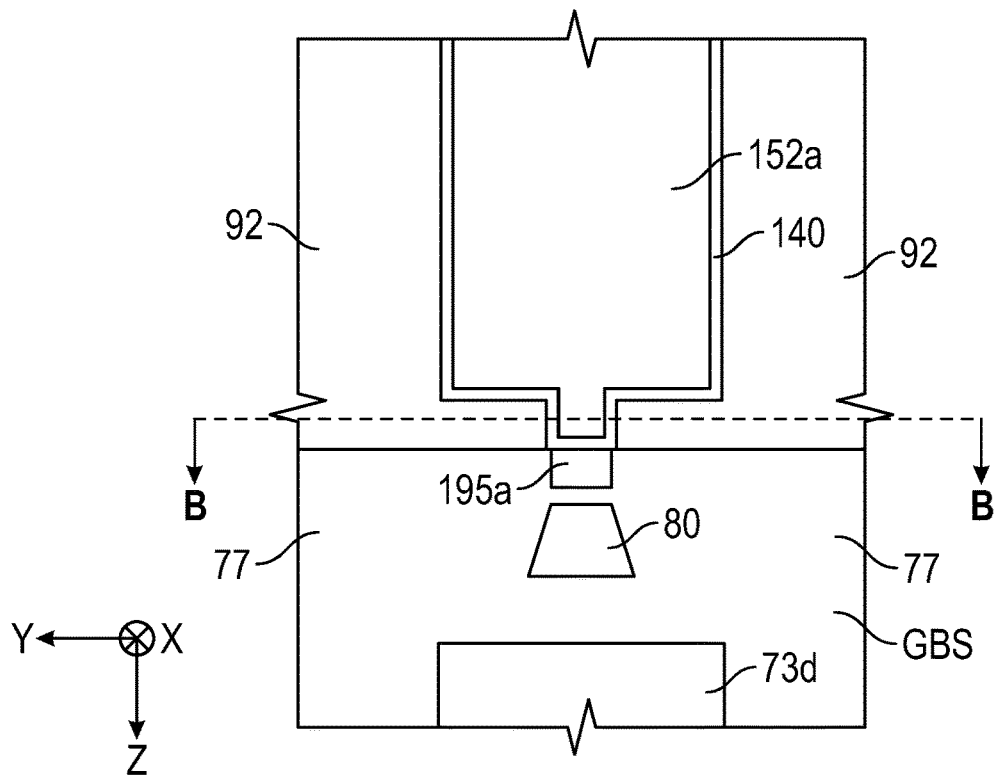
FIG. 6A is a sectional view and FIG. 6B is a view of section B-B of FIG. 6A of a HAMR head according to another embodiment of the invention.
Figure 6B:
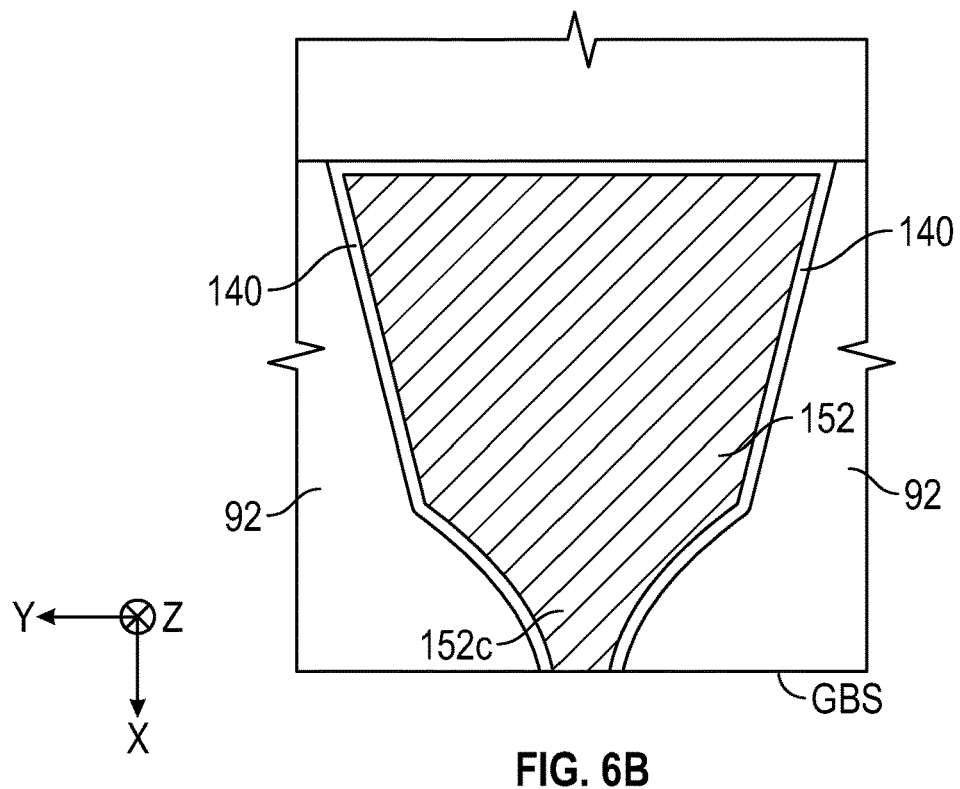

FIG. 6A is a sectional view and FIG. 6B is a view of section B-B of a HAMR head according to another embodiment of the invention. In this embodiment heat sink material 92 is also located on both cross-track sides of main pole 152.

Figure 7A:
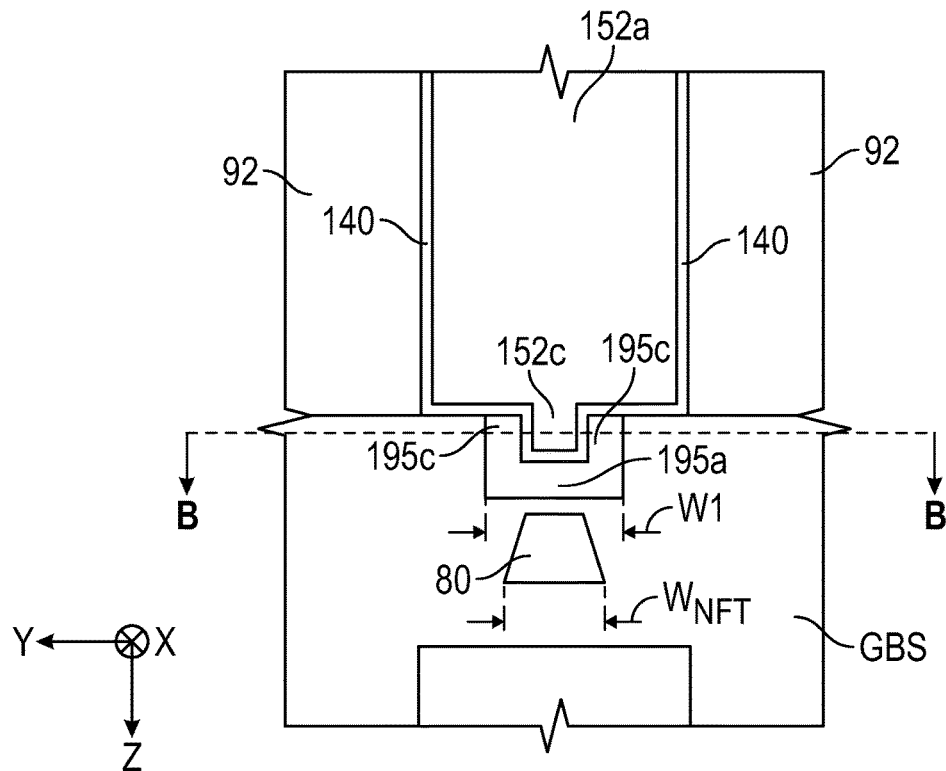
FIG. 7A is a sectional view and FIG. 7B is a view of section B-B of FIG. 7A of a HAMR head according to still another embodiment of the invention.
Figure 7B:
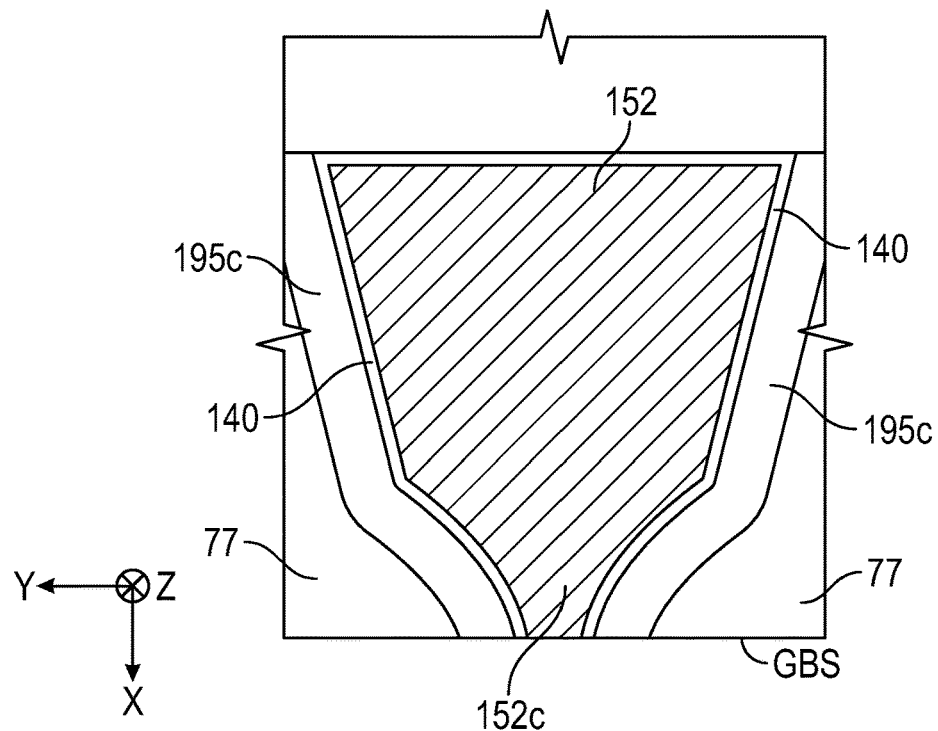

FIG. 7A is a sectional view and FIG. 7B is a view of section B-B of a HAMR head according to still another embodiment of the invention. In this embodiment the plasmonic layer 195 has plasmonic tip 195a between the main pole tip 152c and the NFT 80 but also side portions 195c located on the cross-track sides of main pole 152 and pole tip 152c. In this embodiment the plasmonic tip 195a can have a cross-track width W1 greater than the cross-track width $W_{NFT}$ of NFT 80.

The plasmonic layer 195 may being formed of one or more of Au, Rh, Ir, Cu, Ag, Al, Ru, Cr, Pt, Ti, Fe, Co, Ni, Pd, Be, Mo, W and AlN and TiN alloys.

Figure 8:
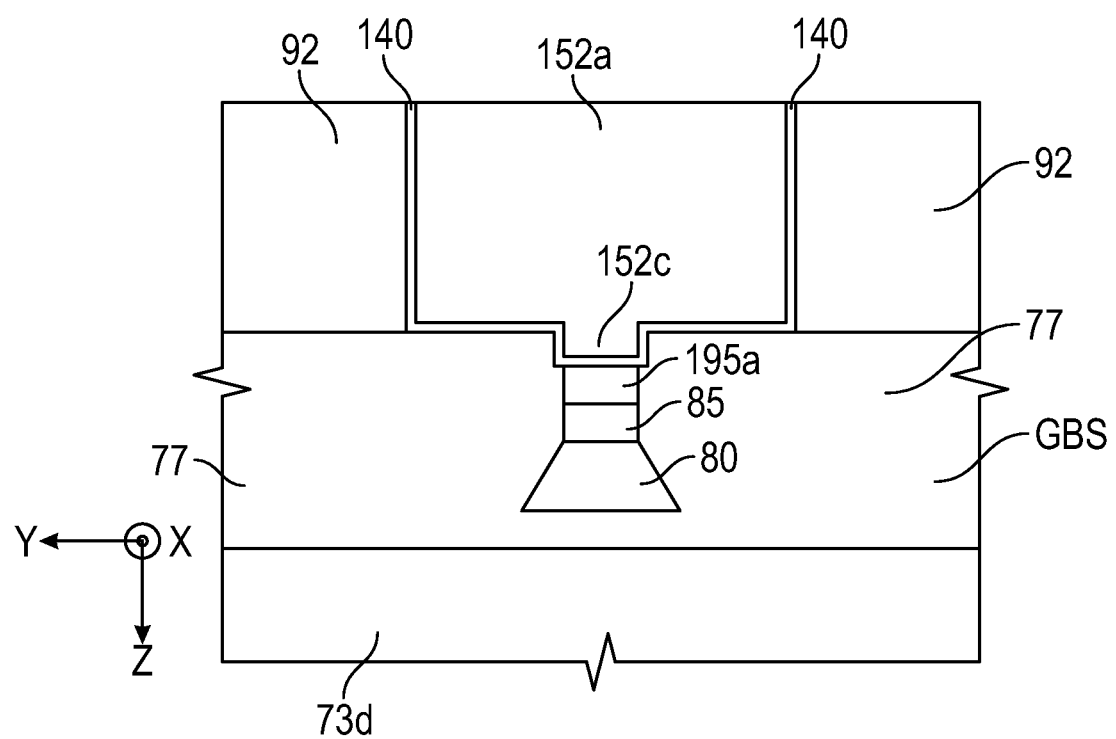
FIG. 8 is a GBS view like FIG. 5A and shows an embodiment where the gap material between plasmonic tip and NFT output tip is formed of a different material than the cladding material.

FIG. 8 is a GBS view like FIG. 5A and shows an embodiment where the gap material 85 between plasmonic tip 195a and NFT output tip 80 is formed of a different material than cladding material 77. The gap material 85 is shown as having the cross-track width substantially the same as the cross-track width of the narrowest portion of the NFT output tip 80 ($W_{TOP}$), but it can have a cross-track width greater than the cross-track width of the plasmonic tip 195a. Materials that can be used for the gap material 85 include $TiO_2$, $Ta_2O_5$, $Al_2O_3$, $Y_2O_3$, $MgF_2$, MgO, SiN, SiC and AlN. A lower refractive index material like $MgF_2$ can improve the optical efficiency and reduce the laser power and NFT temperature. A higher refractive index material like $TiO_2$ or $Ta_2O_5$ can reduce the reflectance of the NFT, which can reduce mode hop of the laser. A material with a higher thermal conductivity like AlN can reduce the NFT temperature.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer comprising:
    a head carrier having a recording-layer-facing surface, an along-the-track axis and a cross-track axis substantially orthogonal to the along-the-track axis;
    a near-field transducer (NFT) layer on the head carrier on a surface substantially orthogonal to the recording-layer-facing surface and having an NFT output tip substantially at the recording-layer-facing surface with a cross-track width;
    a main pole on the head carrier, the main pole facing the NFT layer and having a pole tip substantially at the recording-layer-facing surface and aligned with the NFT output tip in the along-the-track direction, the pole tip having a cross-track width substantially equal to or less than the cross-track width of the NFT output tip;
    a layer of plasmonic material on the main pole between the main pole and the NFT layer, the plasmonic layer including a plasmonic tip on the pole tip and aligned with the NFT output tip in the along-the-track direction; and
    an optical waveguide on the head carrier and optically coupled to the NFT layer.

2. The HAMR head of claim 1 wherein the height of the plasmonic layer in a direction orthogonal to the recording-layer-facing surface is substantially equal to or less than the height of the main pole in a direction orthogonal to the recording-layer-facing surface.

3. The HAMR head of claim 1 wherein the cross-track width of the plasmonic layer in a region away from the plasmonic tip in a direction orthogonal to the recording-layer-facing surface is greater than the cross-track width of the plasmonic tip.

4. The HAMR head of claim 1 wherein the plasmonic layer is on the entirety of the main pole.

5. The HAMR head of claim 1 wherein the plasmonic layer is on the cross-track sides of the main pole and the cross-track sides of the pole tip.

6. The HAMR head of claim 1 wherein the cross-track width of the plasmonic layer is less than the cross-track width of the main pole in the region recessed from the recording-layer-facing surface.

7. The HAMR head of claim 1 wherein the cross-track width of the plasmonic layer is greater than the cross-track width of the main pole in the region recessed from the recording-layer-facing surface.

8. The HAMR head of claim 1 further comprising a thermal shunt in contact with the plasmonic layer.

9. The HAMR head of claim 8 wherein the plasmonic layer has a back edge recessed from the recording-layer-facing surface and in contact with the thermal shunt.

10. The HAMR head of claim 1 wherein the plasmonic material comprises one or more of Au, Rh, Ir, Cu, Ag, Al, Ru, Cr, Pt, Ti, Fe, Co, Ni, Pd, Be, Mo, W, AlN alloy and TiN alloy.

11. The HAMR head of claim 1 further comprising a diffusion barrier between the main pole and the plasmonic layer.

12. The HAMR head of claim 1 further comprising a layer of gap material between the plasmonic tip and the NFT output tip, the gap material selected from $TiO_2$, $Ta_2O_5$, $Al_2O_3$, $Y_2O_3$, $MgF_2$, MgO, SiN, SiC and AlN.

13. The HAMR head of claim 1 further comprising heat sink material on the cross-track sides of the main pole.

14. The HAMR head of claim 13 wherein the heat sink material is located on the cross-track sides of the main pole tip at the recording-layer-facing surface.

15. A heat-assisted recording (HAMR) disk drive comprising:
- the HAMR head of claim 1 further comprising a magnetoresistive read head on the head carrier;
- a laser for directing light to the waveguide; and
- a magnetic recording disk having a magnetic recording layer.

16. A heat-assisted magnetic recording (HAMR) head for writing to a magnetic recording layer comprising:
- a gas-bearing slider having a gas-bearing surface (GBS), an along-the-track axis and a cross-track axis substantially orthogonal to the along-the-track axis;
- a near-field transducer (NFT) layer on the slider on a surface substantially orthogonal to the GBS and having an output tip substantially at the GBS with a cross-track width;
- a main pole on the slider, the main pole facing the NFT layer and having a pole tip substantially at the GBS and aligned with the NFT output tip in the along-the-track direction, the pole tip having a cross-track width substantially equal to or less than the cross-track width of the NFT output tip;
- a layer of plasmonic material on the main pole between the main pole and the NFT layer and on the cross-track sides of the main pole and the cross-track sides of the pole tip, the plasmonic layer including a plasmonic tip on the pole tip and aligned with the NFT output tip in the along-the-track direction; and
- an optical waveguide on the head carrier and optically coupled to the NFT layer.

17. The HAMR head of claim 16 wherein the height of the plasmonic layer in a direction orthogonal to the GBS is substantially equal to or less than the height of the main pole in a direction orthogonal to the GBS.

18. The HAMR head of claim 16 wherein the cross-track width of the plasmonic layer in a region away from the plasmonic tip in a direction orthogonal to the GBS is greater than the cross-track width of the plasmonic tip.

19. The HAMR head of claim 16 wherein the cross-track width of the plasmonic layer in a region recessed from the GBS is less than or greater than the cross-track width of the main pole in a region recessed from the GBS.

20. The HAMR head of claim 16 further comprising a thermal shunt between the NFT and the main pole and wherein the plasmonic layer has a back edge recessed from the GBS and in contact with the thermal shunt.

21. The HAMR head of claim 16 wherein the plasmonic material comprises one or more of Au, Rh, Ir, Cu, Ag, Al, Ru, Cr, Pt, Ti, Fe, Co, Ni, Pd, Be, Mo, W, AlN alloy and TIN alloy.

22. The HAMR head of claim 16 further comprising a diffusion barrier between the main pole and the plasmonic layer.

23. The HAMR head of claim 16 further comprising a layer of gap material between the plasmonic tip and the NFT output tip, the gap material selected from $TiO_2$, $Ta_2O_5$, $Al_2O_3$, $Y_2O_3$, $MgF_2$, MgO, SiN, SiC and AlN.

24. A heat-assisted recording (HAMR) disk drive comprising:
- the HAMR head of claim 16 further comprising a magnetoresistive read head on the slider;
- a laser for directing light to the waveguide; and
- a magnetic recording disk having a magnetic recording layer.

* * * * *